United States Patent
Abouzeid et al.

(10) Patent No.: US 11,934,487 B2
(45) Date of Patent: Mar. 19, 2024

(54) SPLITTING NEURAL NETWORKS ON MULTIPLE EDGE DEVICES TO TRAIN ON VERTICALLY DISTRIBUTED DATA

(71) Applicant: EMC IP Holding Company LLC, Hopkinton, MA (US)

(72) Inventors: Mohamed Abouzeid, Giza (EG); Osama Taha Mohamed, Cairo (EG); AbdulRahman Diaa, Cairo (EG)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 421 days.

(21) Appl. No.: 17/039,702

(22) Filed: Sep. 30, 2020

(65) Prior Publication Data

US 2022/0101054 A1    Mar. 31, 2022

(51) Int. Cl.
*G06F 18/214* (2023.01)
*G06F 18/21* (2023.01)
*G06N 3/04* (2023.01)
*H04L 9/40* (2022.01)

(52) U.S. Cl.
CPC ...... *G06F 18/2148* (2023.01); *G06F 18/2185* (2023.01); *G06N 3/04* (2013.01); *H04L 63/04* (2013.01)

(58) Field of Classification Search
CPC ...... G06K 9/6257; G06K 9/6264; G06N 3/04; G06N 3/063; G06N 3/084; H04L 63/04
See application file for complete search history.

(56) References Cited

U.S. PATENT DOCUMENTS

| | | | |
|---|---|---|---|
| 11,057,318 B1* | 7/2021 | Matthews | H04L 45/56 |
| 2018/0089593 A1* | 3/2018 | Patel | G06F 8/71 |
| 2018/0285678 A1* | 10/2018 | Baum | G06F 30/27 |
| 2020/0174840 A1* | 6/2020 | Zhao | G06F 9/5011 |
| 2021/0117780 A1* | 4/2021 | Malik | G10L 15/30 |
| 2021/0142160 A1* | 5/2021 | Mohseni | G06F 18/24 |
| 2021/0334630 A1* | 10/2021 | Lambert | G06N 3/047 |
| 2022/0051017 A1* | 2/2022 | Choi | G06T 11/20 |
| 2022/0067983 A1* | 3/2022 | Fidler | G06N 3/047 |

FOREIGN PATENT DOCUMENTS

WO    WO-2020131968 A1 *    6/2020    ............... G06N 3/04

* cited by examiner

*Primary Examiner* — Qun Shen
(74) *Attorney, Agent, or Firm* — Workman Nydegger

(57) ABSTRACT

One example method includes a pipeline for a distributed neural network. The pipeline includes a first phase that identifies intersecting identifiers across datasets of multiple clients in a privacy preserving manner. The second phase includes a distributed neural network that includes a data receiving portion at each of the clients and an orchestrator portion at an orchestrator. The data receiving portions and the orchestrator portions communicate forward and backward passes to perform training without revealing the raw training data.

20 Claims, 11 Drawing Sheets

SPLITTING NEURAL NETWORKS ON MULTIPLE EDGE DEVICES TO TRAIN ON VERTICALLY DISTRIBUTED DATA

FIELD OF THE INVENTION

Embodiments of the present invention generally relate to machine learning and in particular to neural networks. More particularly, at least some embodiments of the invention relate to systems, hardware, software, computer-readable media, and methods for distributed neural networks and neural network operations including neural network operations in distributed neural networks.

BACKGROUND

A neural network, which is an example of machine learning, is a system of interconnected processing nodes or elements. The elements, or neurons, of the network each contribute to the processing being performed. In order to operate properly, neural networks are trained using datasets. These datasets are typically very large in nature.

Training a neural network using these datasets, when the datasets are distributed, is a challenging task for various reasons. First, transferring the distributed datasets is impacted by data privacy constraints. Second, transferring these large datasets can result in a significant cost. In addition, the computational power needed to process these very large datasets is also expensive.

With regard to privacy, general data protection regulations (GDPR) often prevent anyone from transferring data. The inability to transfer data is a substantial roadblock for neural networks because the data cannot be brought to a centralized location that has the processing power needed to process large datasets.

With regard to distributed datasets, a neural network has difficulty in using data that is remote from the centralized location and distributed. Federated averaging is one approach to resolving the problem of using neural networks with distributed datasets. However, this approach suffers from high communication and computational costs.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Embodiments of the present invention generally relate to machine learning and machine learning methods and architectures. More particularly, at least some embodiments of the invention relate to systems, hardware, software, computer-readable media, and methods for neural networks including distributed neural networks, neural network operations including neural network training operations, and distributed neural network architectures.

In general, example embodiments of the invention relate to an architecture for a distributed neural network. The neural network is split or structured such that the neural network, or a portion thereof, operates on each of multiple edge devices. When operating with vertically distributed data, each of the edge devices has its own data. Embodiments of the invention include training a neural network that is distributed or split across all of the participating edge devices. Insights can be collected about each part of the intersecting data points across all of the edge devices in a distributed architecture. Patterns are learned such that the neural network can classify data after the training process is completed.

Embodiments of the invention train neural networks using distributed data, including vertically distributed data, while preserving privacy and while managing communication and computational costs. The neural network may be implemented using a pipeline or structured in phases. The pipeline includes a first phase that focuses on identifying the common identifiers (IDs) between the participating data nodes or edge devices without revealing any of the non-intersecting Identifiers to other data nodes. In other words, the first phase preserves privacy and is able to comply with privacy regulations. The second phases focuses on training the neural network by splitting or distributing the neural network across the participating data nodes or edge devices, which may also be referred to herein as clients.

Figure 1A:
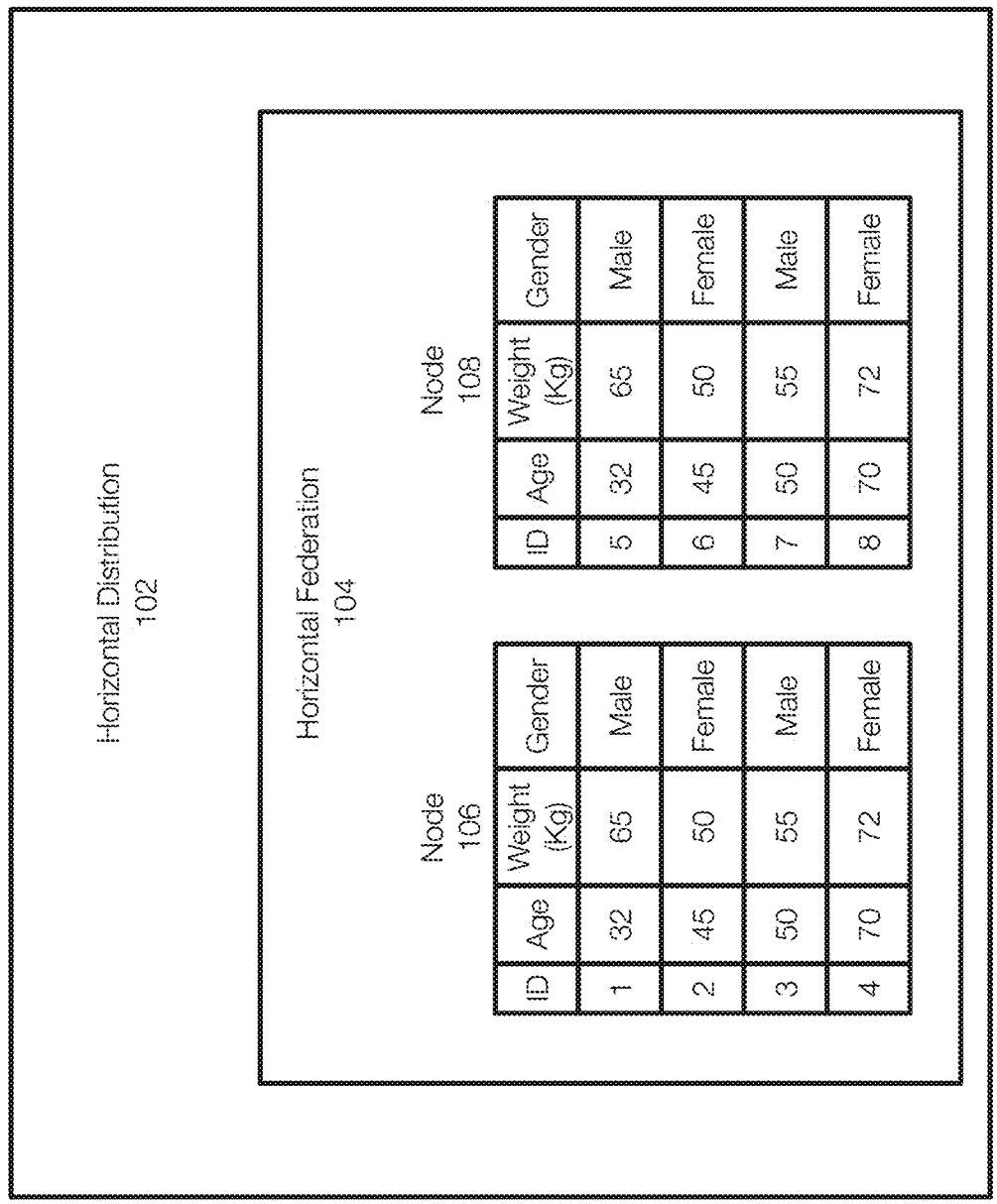
FIG. 1A discloses aspects of a horizontally distributed dataset.

Before discussing the pipeline in more detail, a brief discussion of neural networks and distributed data is provided. FIG. 1A illustrates an example of a horizontal data distribution. FIG. 1A illustrates a horizontal federation 104 for a horizontal distribution 102 of data. The federation 104 includes a plurality of nodes illustrated as nodes 106 and 108. As illustrated in FIG. 1A, each of the nodes 106 and 108 in the horizontal federation has the same data. For example, in the case of distributed medical records data, all nodes would have the same attributes (age, weight, and gender in FIG. 1A). However, the nodes have different identifiers. The node 106, for example, stores attributes for identifiers 1-4 and the node 108 stores attributes for identifiers 5-8.

Figure 1B:
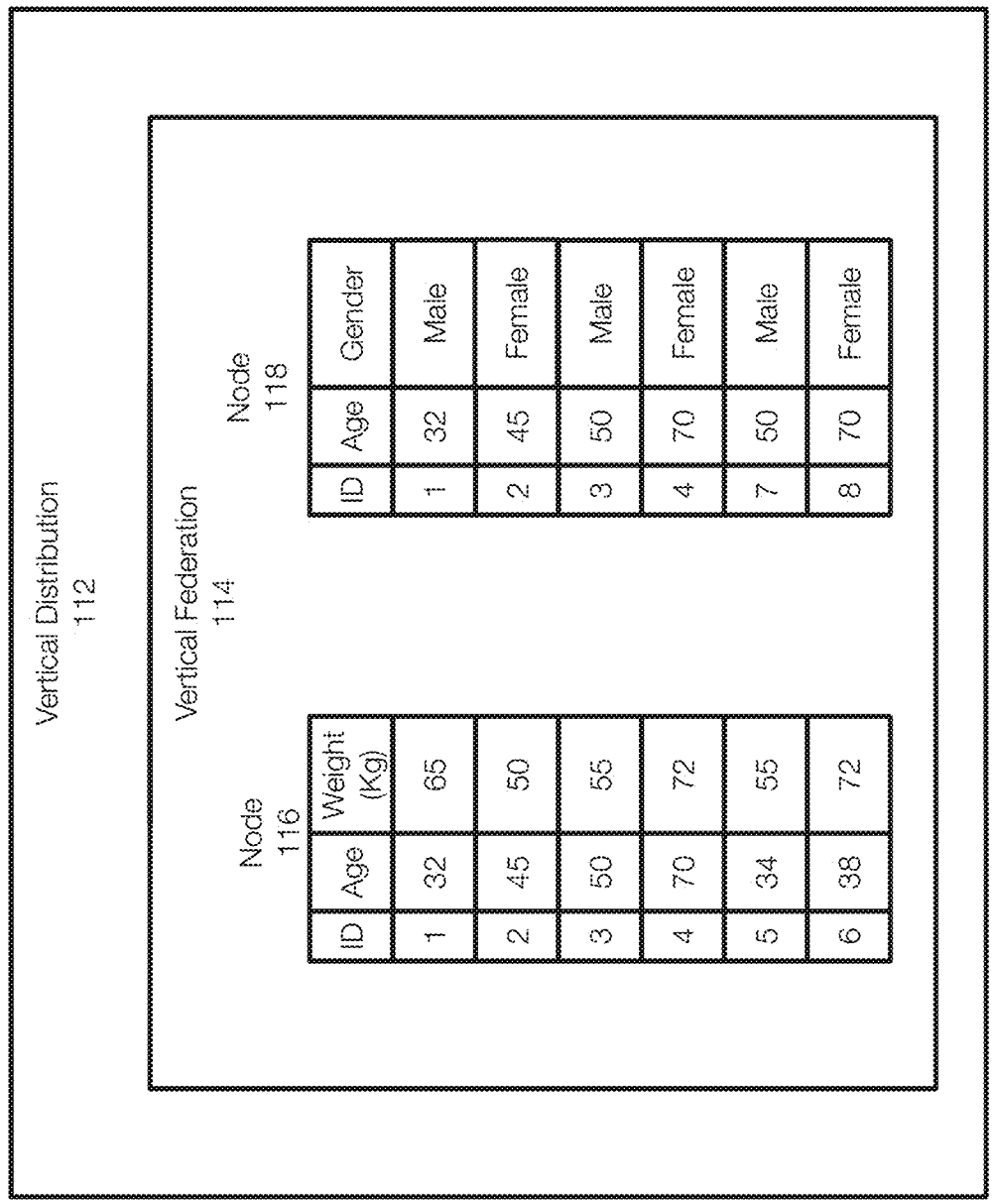
FIG. 1B discloses aspects of a vertically distributed dataset.

FIG. 1B illustrates an example of a vertical data distribution. FIG. 1B illustrates a vertical federation 114 for a vertical distribution 112. The vertical federation 114 includes at least nodes 116 and 118. FIG. 1B illustrates that the data is split based on the attributes rather than the identifiers or records. For example, the node 116 stores the age and weight attributes for identifiers 1-6 and the node 118 stores the age and weight attributes for identifiers 1-4 and 7-8. The intersecting identifiers include the identifiers 1-4. As previously mentioned, the first phase of the pipeline would identify these intersecting identifiers and use the data associated with the intersecting identifiers to train the distributed neural network.

FIG. 1B illustrates that the attributes or features of the dataset associated with the identifiers are different at the nodes. FIG. 1B also illustrates that some of the identifiers are the same at each of the nodes in the vertical distribution 112. Embodiments of the invention relate to divided or distributed neural networks that are capable of performing supervised and/or unsupervised learning or training using vertical or horizontal data distributions.

Generally, machine learning relates to using computer implemented algorithms to mine data or learn patterns in data. This allows the machine learning to generalize the mined data or learned patterns to new data. When trained, machine learning, or neural networks, are able to generate predictions or insights for new data without being programmed with task-specific rules. Deep learning is largely based on artificial neural networks and is an example of machine learning. Neural networks, in the context of deep learning, typically have multiple layers. Using multiple layers results in a more accurate algorithm and improves the results—the predictions and insights into the data.

Figure 2:
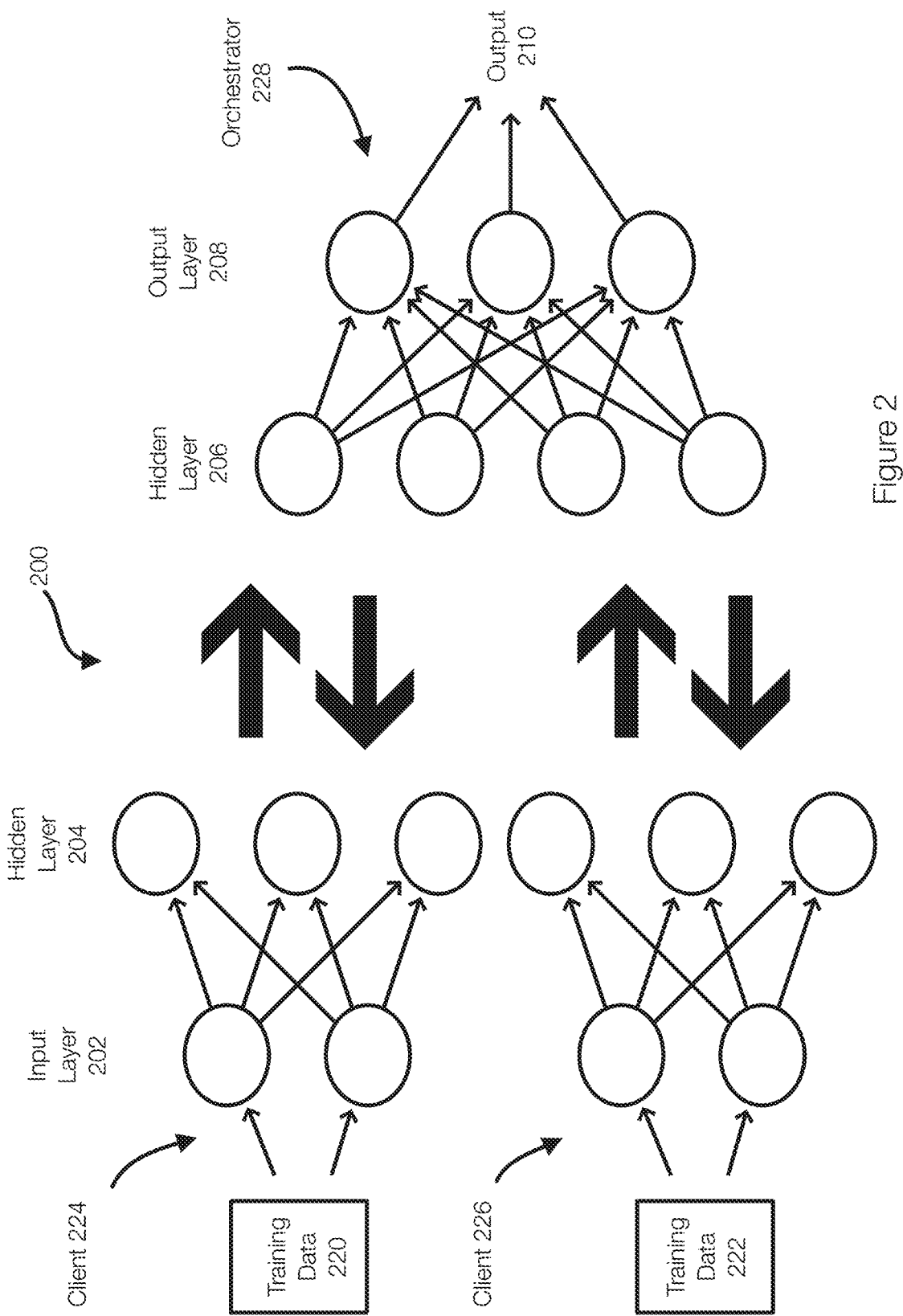
FIG. 2 illustrates an example of a distributed neural network.

FIG. 2 illustrates a simple example of a distributed neural network. The neural network 200 illustrates training data 220 at a client 224 and training data 222 at a client 226. The neural network 200 illustrates that some of the layers operate and the clients. In this example, the input layer 202 and the hidden layer 204 operate at each of the clients 224 and 226. The portion of the distributed neural network 200 at the client 224 and at the client 226 includes an input layer 202 and a hidden layer 204. The portion of the neural network at an orchestrator 228 includes a hidden layer 206 and an output layer 208. Training data 220 and 222 is input to the neural network 200 and an output 210 is obtained. As the training data 200 passes through the neural network 200, each node or neuron may process data and then transfer information to the next node or nodes in the neural network 200. Ultimately, an output 210 such as a prediction or insight is generated by the neural network 200.

The distributed neural network 200 is configured such that the distributed portions communicate. For example, the last layer at the clients 224 and 226 is the hidden layer 204. The output of the hidden layer 204 can be passed to the orchestrator 228 as a forward pass. Information such as error information can be propagated using a backward pass. These communications, including the forward and backward passes, are transmitted over a network for example.

Embodiments of the distributed neural network are secure and maintain privacy at least because the training data 220 and 222 is not transmitted over the network, but remains at the clients 224 and 222. Further, the training data 220 and 222 cannot be derived from the communications including the forward and backward passes. In addition, the non-intersecting identifiers (identifiers that are not common to all clients) are not discovered by any of the other clients.

Neural networks can be supervised or unsupervised in nature. In supervised neural networks, data with known ground truth (labels) may be used in the training process. In unsupervised neural networks, the labels may not be known. However, the unsupervised neural network is attempting to obtain insights from the data. Unsupervised models may be trained using mathematical calculations to learn more about the different data patterns, which leads to more accurate outputs or predictions.

Distributed learning may occur in the context of edge devices or clients. Embodiments of the invention are able to gain insights from distributed data without violating privacy and by dividing the neural network into pieces or parts. Embodiments of the invention gain insight from horizontally or vertically distributed data without moving the raw data from its original location. Rather, embodiments of the invention transfer intermediate results between nodes (e.g., between the clients and the orchestrator). These intermediate results do not reveal any information about the raw data. In other words, the intermediate results cannot be reverse engineered from the raw data or to obtain the raw data.

With distributed or federated learning, the model may take into account the structure of the data. For horizontally distributed data, the intermediate results may include insights on the records row by row. For vertically distributed data, the intermediate results may include insights column by column.

Figure 3:
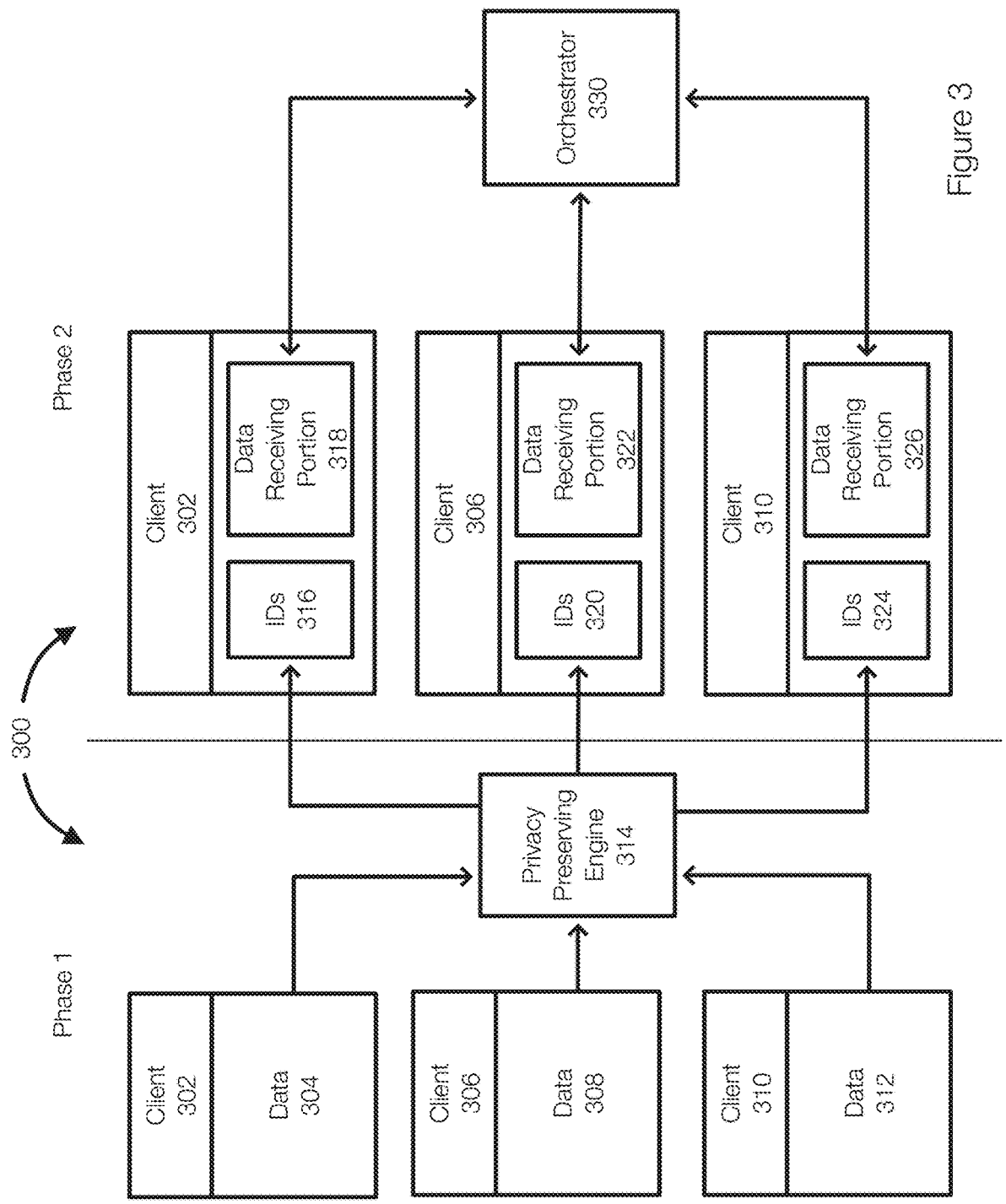
FIG. 3 discloses aspects of a pipeline that implements a distributed neural network.

FIG. 3 illustrates an example of a pipeline that can be implemented in the context of a neural network. In this example, the pipeline 300 allows the neural network to be distributed to and operate on multiple devices. The pipeline 300 includes, by way of example only, first and second phases (phase 1 and phase 2 in FIG. 3). The first phase focuses on identifying the common or intersecting identifiers across the participating nodes (represented as clients 302, 306, and 310). The data from these participating nodes and associated with the intersecting identifiers is represented as data 304, 308, and 312.

Phase 1 of the pipeline 300 is configured to identify the identifiers that are common with regard to the participating clients 302, 306, and 310. This is achieved without revealing all of the existing identifiers and without revealing non-intersecting identifiers. Thus, the identifiers of the client 302 that are not common to all of the clients are not revealed to the clients 306 and 310 or the orchestrator 330. The privacy preserving engine 314 is configured to identify the common identifiers without revealing any of the non-intersecting identifiers to any other edge device.

Figure 4:
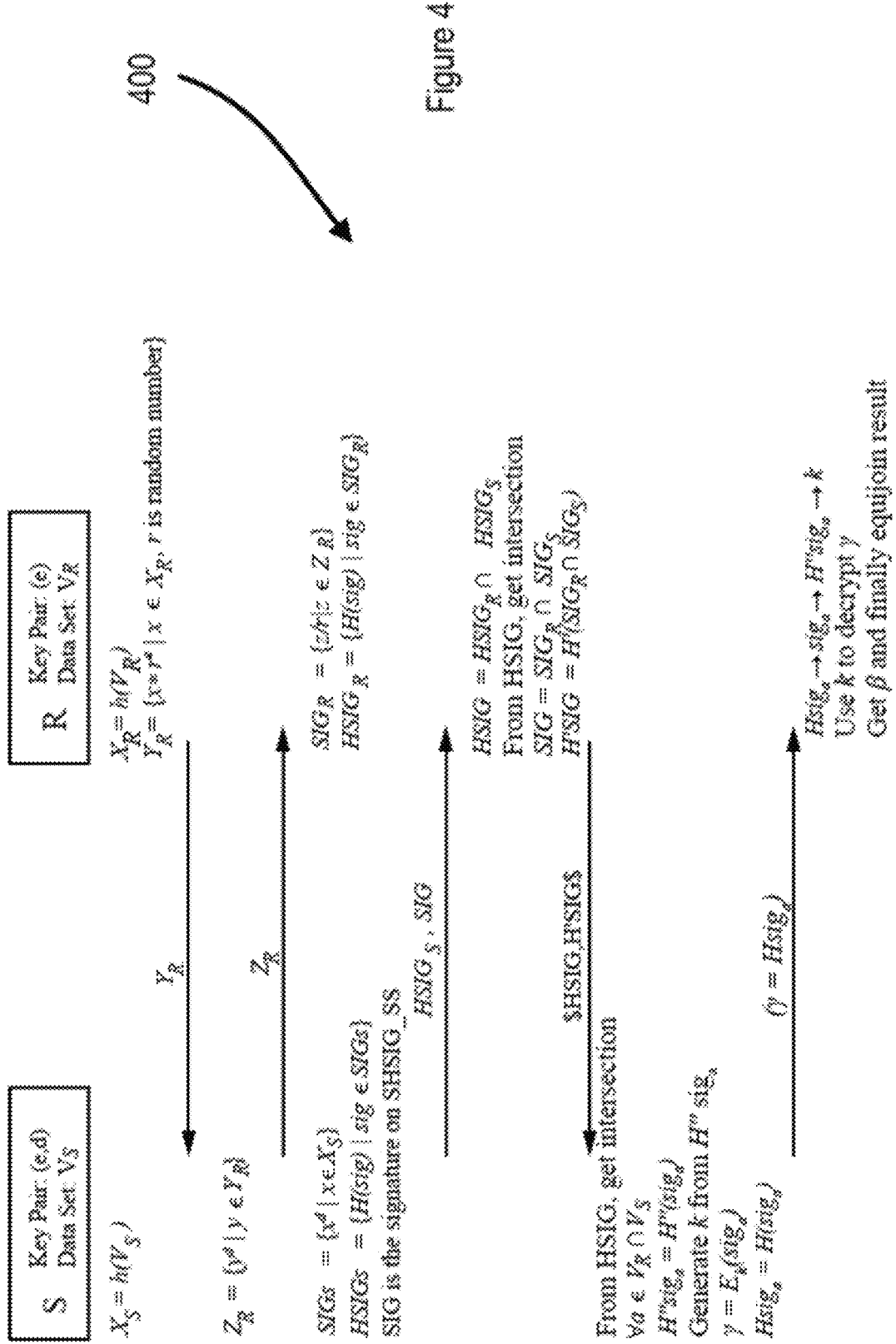
FIG. 4 illustrates an example of a privacy preserving method that allows intersecting identifiers from distributed data sets to be identified.

FIG. 4 illustrates an example method for identifying the intersecting identifiers. In this example, the method 400 identifies the intersecting identifiers associated with the clients 302, 306, and 308. As shown in FIG. 4, to determine the common identifiers between two data nodes S and R (e.g., client 302 and 306), the method 400 is performed. This process can be performed for pairs of nodes or generalized for multiple nodes participating in the distributed neural network.

Generally, the data nodes S and R should apply a hash function to their datasets. Then, data node S generates an RSA key pair and sends its public key to R. The site R blinds its own data using random values computing Yr using the public key received from S. The data node R sends Yr to S, S signs Yr with its private key computing Zr without changing its order and sends it back to data node R.

Next, data node R uses the saved set of random numbers to unblind Zr to obtain the real signature SIGr. Afterwards, R applies another hash function on SIGr computing HSIGr. S signs its own data computing SIGs then applies another hash function on SIGs computing HSIGs and sends it to R. Finally, R compares the two sets (HSIGs and HSIGr) to know the intersecting IDs between the two data nodes. FIG. 4 sets forth this process in more detail.

If changes to the datasets are made, phase 1 can be repeated. More generally, phase 1 can be repeated as necessary.

Phase 2 relates to the architecture of the distributed network. In this example, the privacy preserving engine 314 may identify the intersecting identifiers to the clients. For purposes of the neural network, the IDs 316, 320, and 324 correspond to the intersecting identifiers across the clients 302, 306, and 310. The data associated with the IDs 316, 320, and 324 can be used as training data for the neural network. After training the neural network, new data from the clients 302, 306, and 310 or from another data source can be used to generate insights or predictions.

As previously stated, deep neural networks may include multiple interconnected layers and each layer includes neurons or processing elements.

In this example, the neural network is split into a data receiving portion 318, 322, and 326, and an orchestration portion or orchestrator 330. In this example, the orchestrator 330 sends or provides, to the clients 302, 306, and 310, the structure of data receiving portions to the corresponding clients in the neural network. Each of the clients 302, 306, and 310 has their own portion or piece of the neural network 300. The data receiving portions 318, 322, and 326 may be the same or different at least because the datasets 304, 308, and 312 are different.

During training, for example, the data receiving portion 318 will use the data 304. The data 304 is input to the data receiving portion 318. The client 302 then generates a forward pass based on its portion of the dataset (e.g., the data 304). The output of the final layer of the data receiving portion 318 is passed to the orchestrator 303.

Generally, the orchestrator 330 receives a forward pass containing the output of the final layer of each of the data receiving portions 318, 322, and 326. The orchestrator 330 may compute the rest of the forward pass using the output received from the data receiving portions 318, 322, and 326 as input to the orchestrator's portion of the neural network. The orchestrator 330 may compute a loss for this data, which data may be sent as a batch, and start a backward pass of its own part of the neural network.

The backward pass is used to compute the gradients that allow the weights in the neural network to be adjusted in the portion of the neural network at the orchestrator 330 and at the data receiving portions 318, 322, and 326 of the neural network. More specifically, the orchestrator sends the gradients to each of the clients 302, 306, and 310. This process is repeated multiple times until the training process is complete.

Embodiments of the invention ensure than no raw data is transferred from the clients 302, 306, and 310. In other words, the raw data 304, 308, and 312 is not transferred to a central location such as the orchestrator 330. This ensures data privacy and reduces the communication cost associated with training a neural network. In addition, the computational cost on the edge devices (the clients 302, 306, and 310) is reduced because the workload is distributed across all of the clients 302, 306, and 310. This eliminates the need for substantial centralized hardware to perform a training process.

Figure 5:
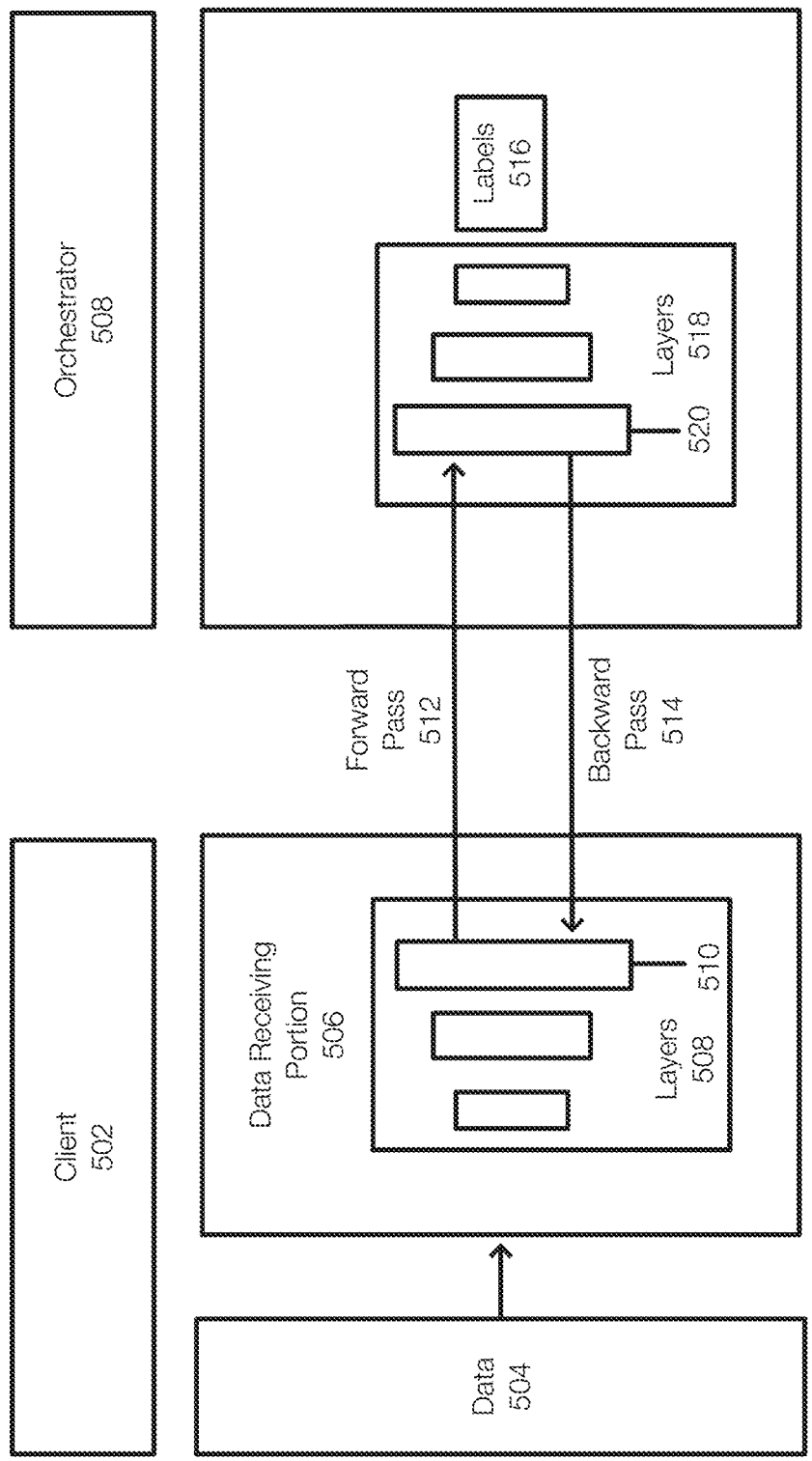
FIG. 5 illustrates an example of a distributed neural network.

FIG. 5 illustrates an example of a distributed neural network. For simplicity, FIG. 5 illustrates the distribution and communications between a single client 502 and an orchestrator 508 or, more specifically, between a data receiving portion 506 of a distributed neural network and the orchestrator's portion of the distributed neural network. However, a similar interaction occurs with all other participating clients as shown in FIG. 3.

More specifically, FIG. 5 illustrates an example of a neural network performing supervised learning using labels. In the example of FIG. 5, the labels 516 reside at the orchestrator 508. FIG. 5 illustrates training data 504 of a client 502 that is input into the data receiving portion 506 of the distributed neural network. The data 504 may be input in batches or in another manner and corresponds to, in one example, the intersecting identifiers, which were identified during phase 1 of the pipeline.

The data passes through or is processed by the layers 508 of the data receiving portion 506, which resides at the client 502. The output of the layer 510, which is the last layer of the data receiving portion 506 is an example of a forward pass 512 that is transmitted to the orchestrator 508. The output of the layer 510 is an input to the layer 520, which is the first layer 520 of the layers 518 of the orchestrator's portion of the neural network.

The forward pass 512 is generated by the data receiving portion 506 and may be specific to the client 502. Other clients may generate similar forward passes that are used as inputs to the layer 520. Thus, the orchestrator's portion of the distributed neural network receives, as input, the output from the last layers of the data receiving portions from all of the participating clients. The forward pass 512 from the client 502 then passes through the layers 518 of the orchestrator's portion of the neural network to complete the forward pass.

In this example, the orchestrator 508 includes labels 516, which correspond to ground truth. The orchestrator, using the labels 516, can determine an error by essentially comparing the output of the distributed neural network with the labels 516. The orchestrator 508 then starts a backward pass 514 which is delivered to the data receiving portion 506. Each of the clients participating in the neural network may receive the same backward pass. Alternatively, each of the clients may receive a portion of the backward pass corresponding to their part of the neural network.

As the backward pass 514 propagates through the layers of the neural network, adjustments to the neurons may be made. For example, weights may be adjusted based on the backward pass. The backward pass 514 may contain gradients that allow adjustments to be made to the data receiving portion 506 and/or the orchestrator's portion of the distributed neural network. FIG. 5 thus illustrates an example of a neural network structure. This process is repeated as necessary to train the distributed neural network.

Figure 6:
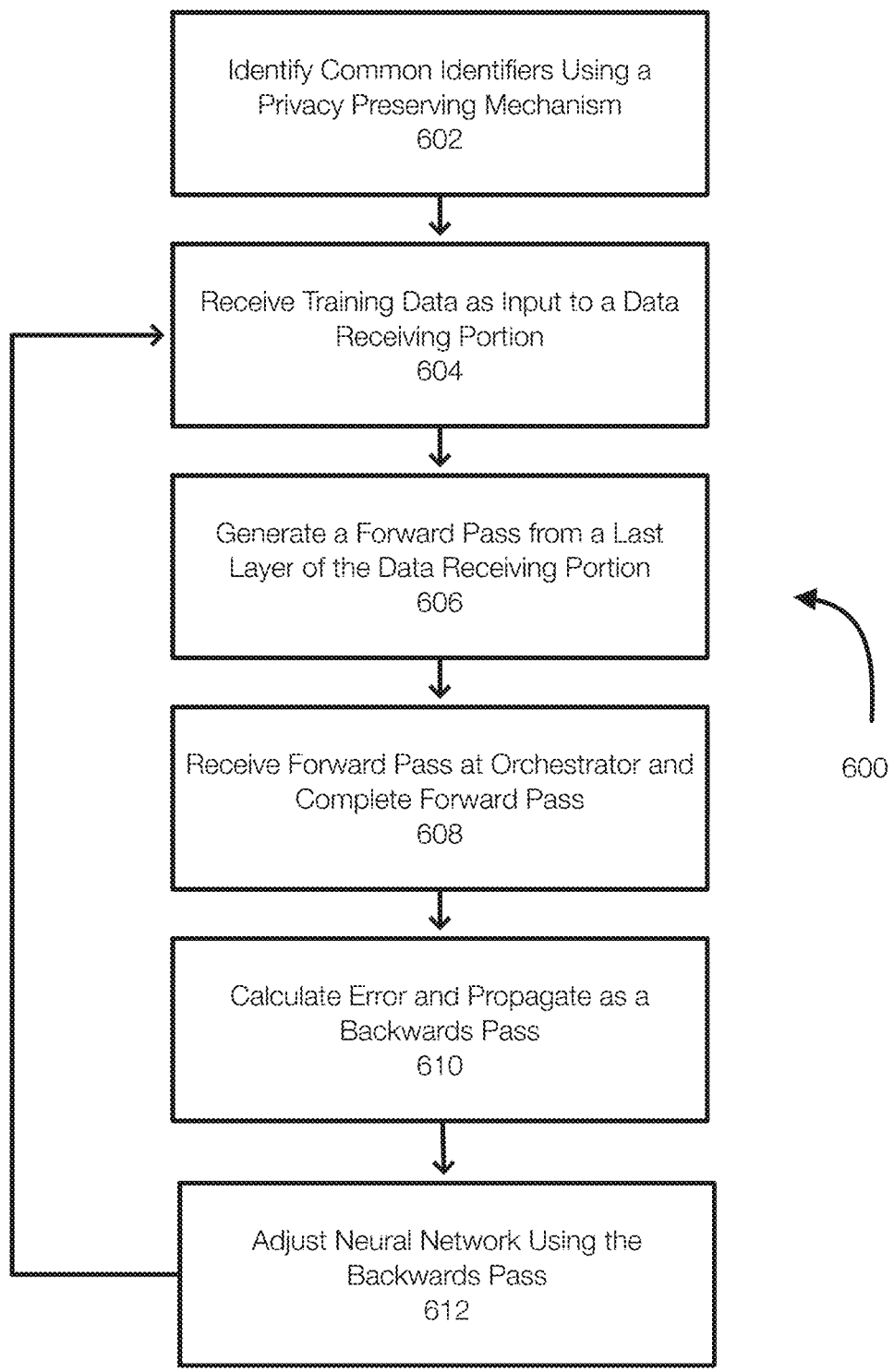
FIG. 6 illustrates an example of a method for training a distributed

FIG. 6 illustrates an example of a method for training a distributed neural network. The method 600 may occur using a specific architecture or structure of a distributed neural network. For example, the neural network may include data receiving portions at the clients and an orchestrator portion at an orchestrator. In addition, labels may be transmitted to and stored at the orchestrator.

The method 600 may begin by performing 602 a privacy preserving algorithm to identify intersecting identifiers amongst a plurality of clients. This process allows the various clients to identify the dataset corresponding to the common identifiers. This dataset may be used as the training data set. Each client may provide their corresponding data, which may be different when the data is vertically distributed across the clients.

The training data is received 604 as input into the data receiving portion of the distributed neural network. This occurs at each of the participating clients. Each of the clients may generate 606 or output a forward pass. The forward pass, in one example, corresponds to the output of the last layers in the data receiving portions of the distributed neural network. The forward passes from the clients are received 608 at the orchestrator and the orchestrator completes the forward pass in the orchestrator's portion of the neural network.

Next, an error may be calculated using the labels, which are stored at the orchestrator in this example, and the error is propagated 610 as a backwards pass through the neural network. The elements of neurons of the neural network are adjusted based on the backwards pass. This process is then repeated with additional training data until training is completed (e.g., the error is sufficiently small). The error may always be calculated and may be an output of a function being optimized by the neural network. The error may always be generated such that the backwards pass can continue to improve the function at least as long as there is training data.

Figure 7:
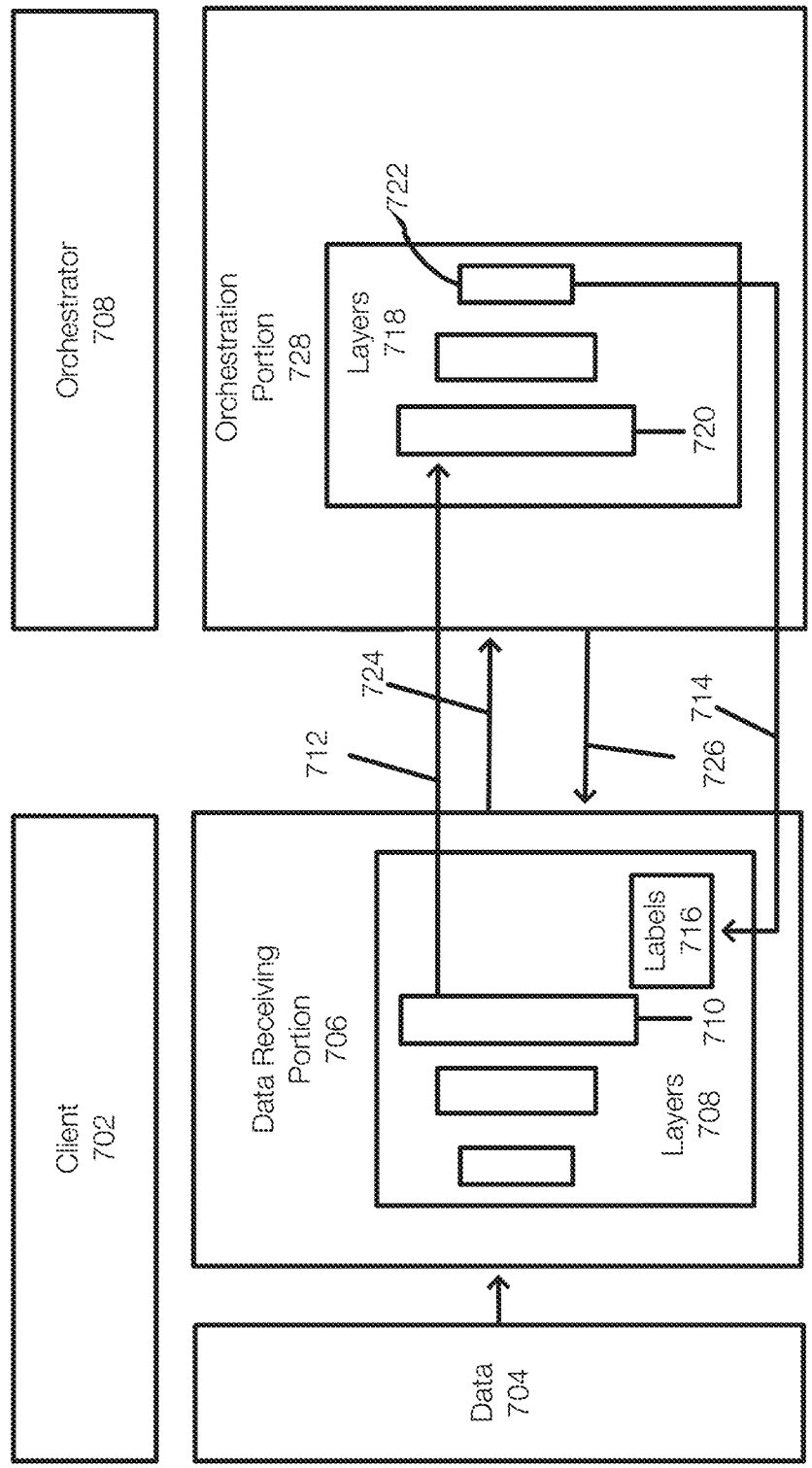
FIG. 7 illustrates another example of a distributed neural network.

FIG. 7 illustrates another example of a distributed neural network. A single client 702 is illustrated in FIG. 7 for ease of explanation, but a similar process occurs with each of the clients participating the distributed network shown in FIG. 7. The architecture of the neural network shown in FIG. 7 includes a data receiving portion 706. Each client has a corresponding data receiving portion of the neural network. The data receiving portion 706 may be the same at each of the clients except that the labels 716 may only reside at one of the clients. The orchestrator has an orchestration portion 728 of the distributed neural network.

The data receiving portion 706 may include layers 708, the last layer of which is layer 710. Labels 716, in this example, remain at the client 702. In one example, only a single client has the labels 716. The neural network may have one set of the labels 716. In this example, because the labels 716 remain at the client 702, the security and privacy is further improved because there is no need to transfer the labels 716 to the orchestrator 708. There is no need to transfer the labels to other clients participating in the neural network. At the same time, this may introduce additional communications compared to the structure of the neural network shown in FIG. 5.

The orchestration portion 728 includes layers 718. The layer 720 is the first layer of the orchestration portion 728 and the layer 722 is an output layer of the orchestration portion 728.

In this example, the training data 704 is input to the data receiving portion 706. The output of the layer 710 constitutes a forward pass 712. The forward pass 712 is an input to the layer 720 of the orchestration portion 728 and may be transmitted over a network. The orchestration portion 728 completes the forward pass in the orchestration portion 728 to generate an output. The output of the layer 722 is transmitted to the client 702 (the data receiving portion) as output 714. The output 714 completes the forward pass even though it returns to the client 702. This allows the data receiving portion to complete the final aspect of the forward pass and generate an error or loss from the labels 716 based on the output 714.

The error or loss 724 is returned to the orchestration portion 728. More specifically, the client 702 returns the error or loss 724 to the orchestrator 708. At this stage, the orchestration portion 728 begins the backwards pass 726 using the error or loss 724. The backwards pass 726 may include gradients used to adjust the weights of the processing elements in the layers of the distributed neural network. This process is repeated until the neural network is trained from the training data 704. A similar process occurs between the orchestrator and the other participating clients.

In FIG. 7 (and in FIG. 5), the orchestrator 708 may initialize the training process by issuing a request to the client 702 to load some of the data corresponding to some specific identifiers into the data receiving portion 706. This allows, in one example, the data 704 to be loaded in batches. Alternatively, the orchestrator 708 may initiate the training process. In one example, the client 702 may be configured to listen or receive these types of requests from the orchestrator 708 or to handle external requests. The data receiving portion 706 may operate as a different process from the process handling external requests.

Embodiments of the invention ensure that data can be loaded into the distributed neural network from the clients without having to transfer the training data from the orchestrator. The training data, in embodiments of the invention, is generated at the clients and does not need to be transmitted to or received from a centralized source. Embodiments of the invention also allow for operating a distributed neural networks once trained without having to transfer the new data over a network.

Figure 8:
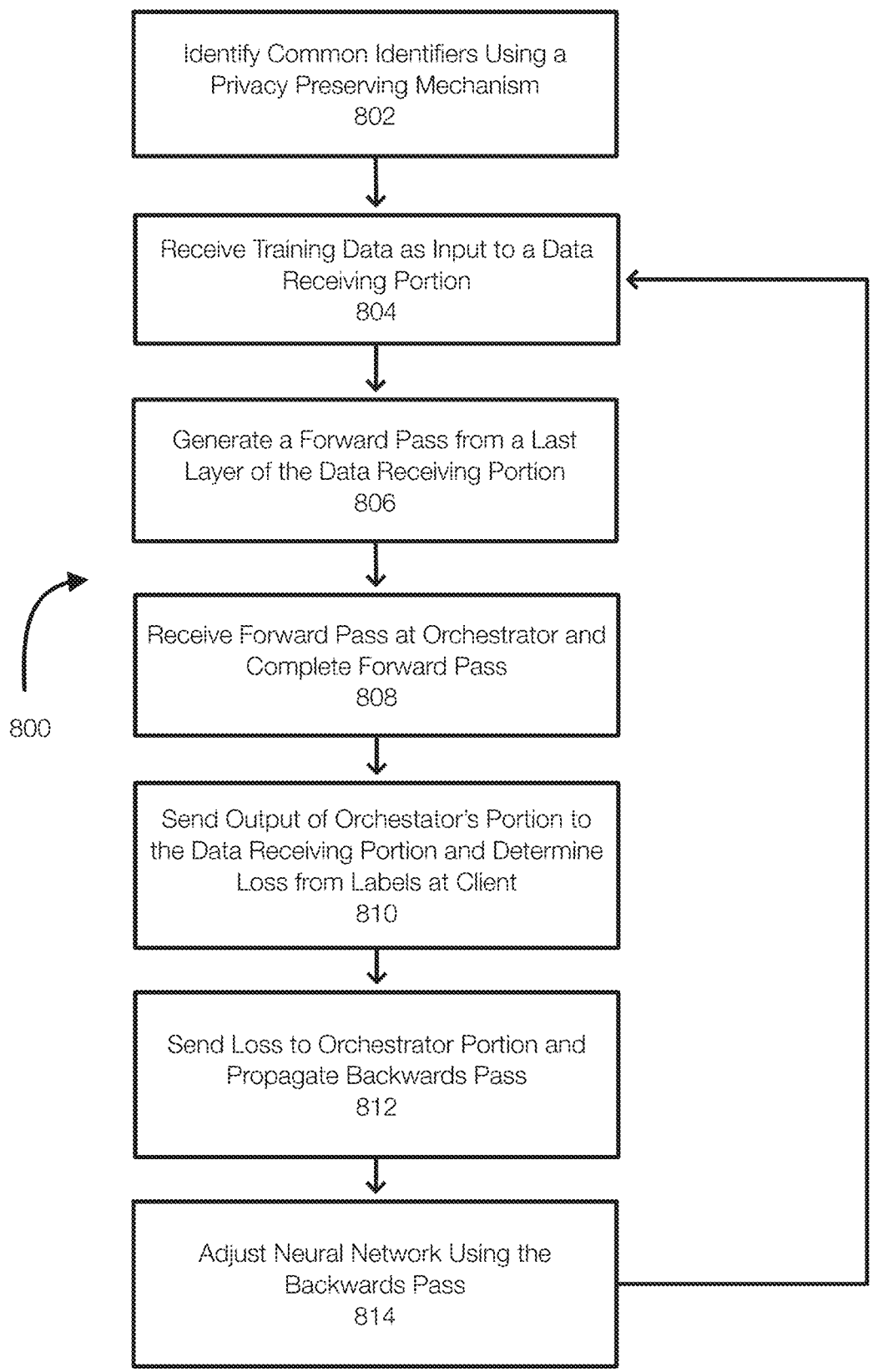
FIG. 8 illustrates an example of a method for training a distributed neural network.

FIG. 8 illustrates an example of a method for training a distributed neural network. Initially, common identifiers are identified 802 in the method 800 using a privacy preserving mechanism. Next, training data is received 804 into the data receiving portions of the neural network. This occurs at each client that participates in the neural network. The output of the last layer of the data receiving portions is output as a forward pass. Thus, the forward pass generated 806 by the last layer of the data receiving portion is received 808 by the orchestrator's portion of the neural network. The orchestrator's portion then completes the forward pass and a result or output is produced.

The output of the orchestrator's portion is sent 810 back to the data receiving portion. The data receiving portion then determines an error or loss from the output using the labels, which are stored at the client in this structure. The loss is then sent 812 back to the orchestrator portion of the neural network and a backwards pass is propagated through the neural network.

Using the backwards pass, the processing elements or neurons of the neural network are adjusted 814. This process is repeated with additional training data until training is complete (e.g., the loss or error is acceptable or within a threshold).

Embodiments of the invention train a distributed or split neural network using distributed data such as vertically distributed data. The neural network can be trained directly on the edge clients or devices where the data originated without sending the data to a centralized location.

The pipeline discussed herein allows this distributed neural network to operate on data corresponding to intersecting identifiers and without passing the data through the orchestrator. Embodiments of the invention provide an architecture or neural network structure that allows a neural network to be trained using data that originates at and remains on edge devices.

For example, a neural network in accordance with embodiments of the invention was trained with a housing dataset that contains data bout houses and their prices. A second dataset is MNIST, which contains images of handwritten digits and their labels. In the two experiments, a centralized neural network was trained and compared to a distributed neural network trained in accordance with embodiments of the Using 150 different experiments, the comparison of the distributed neural network is comparable to the centralized performance.

The parameters included:
Different batch sizes (16, 32, 64, 128, 256)
Different epoch numbers (1, 5, 10, 20, 30)
Two different datasets (housing and MNIST) with two different neural networks
Two different approaches were used:
2 Clients and one orchestrator (3 data nodes)
4 Clients and one orchestrator (5 data nodes)
In one example, the housing dataset was split in a vertical manner as follows:

In this section we will include details and results of our experiments using California housing dataset. We split California housing dataset in a vertical manner as follows:

In the first approach (3 data nodes, 2 clients and one orchestrator) one edge device (client) contained data about the owner of the house and the other edge device (client) contained data about the house itself.

In the second approach (5 data nodes, 4 clients and one orchestrator) two edge devices (clients) contained data about the owner of the house and the other two edge devices (clients) contained data about the house itself.

Figure 9A:
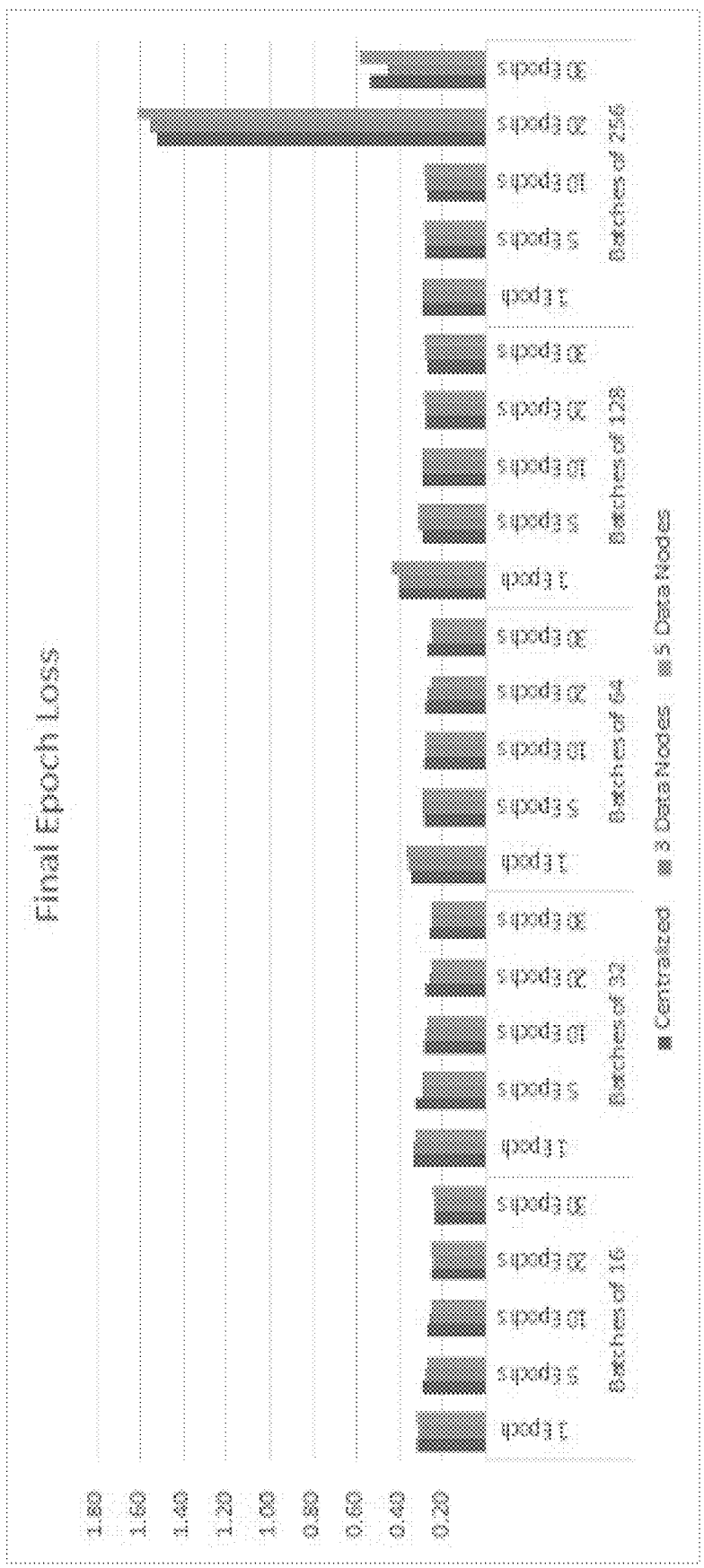
FIG. 9A illustrates a graph of a final epoch loss.
Figure 9B:
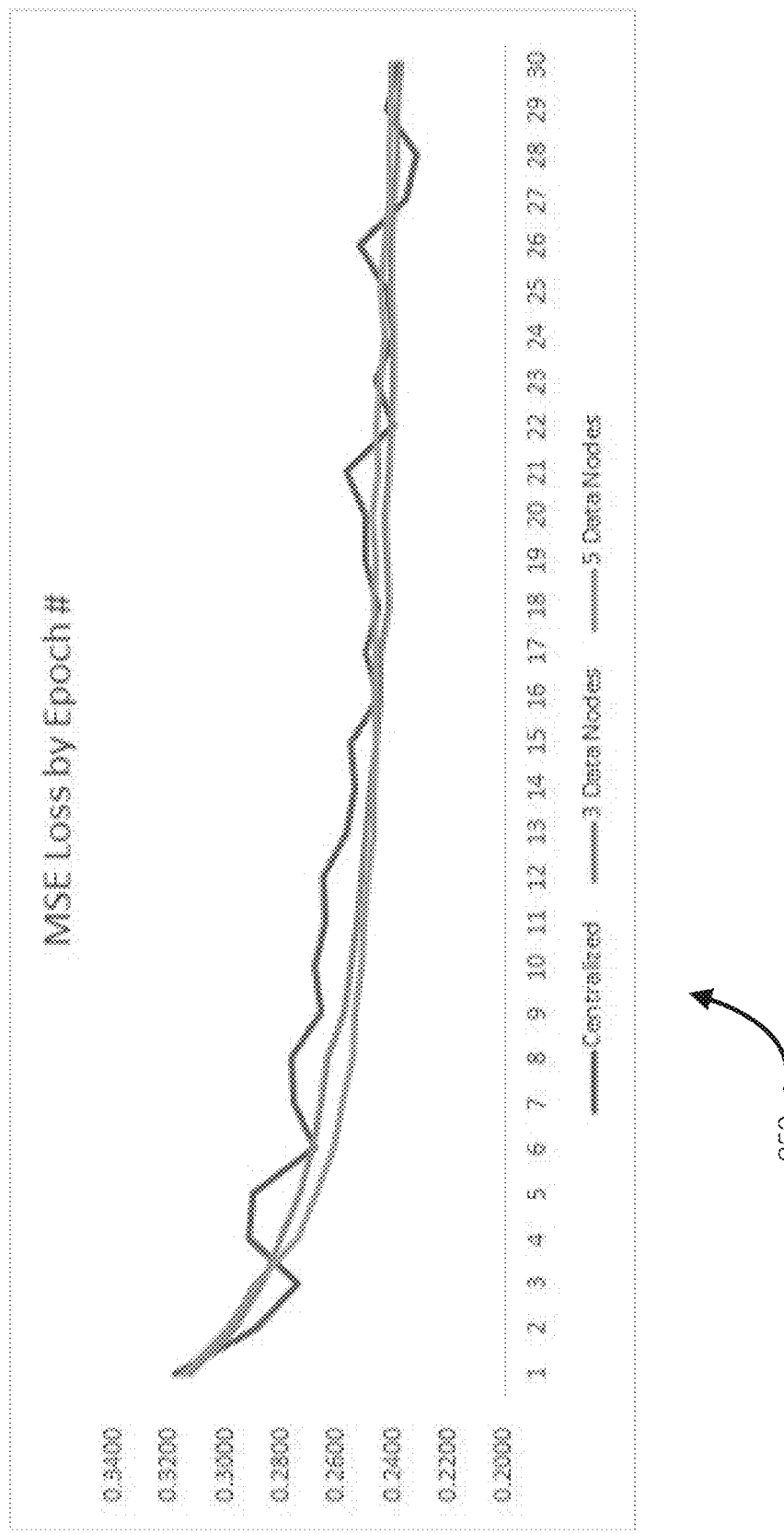
FIG. 9B illustrates a loss by Epoch numbers.

As shown in the FIGS. 9A and 9B by the graphs 900 and 950, the performance of the distributed models using a pipeline are comparable to the performance of the centralized approach while solving or reducing the privacy problems and cost problems. More specifically, the distributed neural network participated in solving the cost (communicational and computational) and privacy problem of training a deep neural network on both horizontally and vertically distributed data.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, distributed neural networks, pipelines and associated operations. More generally, the scope of the invention embraces any operating environment in which the disclosed concepts may be useful.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, or virtual machines (VM)

Particularly, devices in the operating environment may take the form of software, physical machines, or VMs, or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines or virtual machines (VM), though no particular component implementation is required for any embodiment. Where VMs are employed, a hypervisor or other virtual machine monitor (VMM) may be employed to create and control the VMs. The term VM embraces, but is not limited to, any virtualization, emulation, or other representation, of one or more computing system elements, such as computing system hardware. A VM may be based on one or more computer architectures, and provides the functionality of a physical computer. A VM implementation may comprise, or at least involve the use of, hardware and/or software. An image of a VM may take the form of a .VMX file and one or more .VMDK files (VM hard disks) for example.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

It is noted that any of the disclosed processes, operations, methods, and/or any portion of any of these, may be performed in response to, as a result of, and/or, based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted.

Following are some further example embodiments of the invention. These are presented only by way of example and are not intended to limit the scope of the invention in any way.

Embodiment 1. A method for training a distributed neural network, comprising: identifying intersecting identifiers for datasets across clients, each of the clients including a data receiving portion of the distributed neural network, the datasets including training data for the distributed neural network, receiving the training data from the clients as input into corresponding data receiving portions, generating a forward pass at each of the data receiving portions, receiving the forward passes at an orchestrator that includes an orchestrator portion of the distributed neural network;

calculating a loss at the orchestrator portion and propagating the loss through the distributed neural network using a backwards pass from the orchestrator portion to the data receiving portions, and adjusting the neural network based on the backwards pass.

Embodiment 2. The method of embodiment 1, wherein the forward pass, from each of the clients, includes an output from a last layer of the data receiving data portion, wherein the outputs are input into the first layer of the orchestrator portion of the distributed neural network.

Embodiment 3. The method of embodiment 1 and/or 2, further comprising generating the loss from labels stored at the orchestrator and an output of a last layer of the orchestrator portion of the distributed neural network.

Embodiment 4. The method of embodiment 1, 2, and/or 3, further comprising identifying the intersecting identifiers associated with the clients with a privacy preserving mechanism such that none of non-intersecting identifiers are disclosed.

Embodiment 5. The method of embodiment 1, 2, 3, and/or 4, further comprising sending a request, from the orchestrator to the clients, to load at least a batch of the training data into the data receiving portions of the neural network.

Embodiment 6. The method of embodiment 1, 2, 3, 4, and/or 5, further comprising the orchestrator providing the clients with a structure of the distributed neural network.

Embodiment 7. The method of embodiment 1, 2, 3, 4, 5, and/or 6, further comprising training the distributed neural network with the training data.

Embodiment 8. A method for training a distributed neural network, comprising: identifying intersecting identifiers for datasets across clients, each of the clients including a data receiving portion of the distributed neural network, the datasets including training data for the distributed neural network, receiving the training data from the clients as input into corresponding data receiving portions, generating a forward pass at each of the data receiving portions, receiving the forward passes at an orchestrator that includes an orchestrator portion of the distributed neural network, sending an output of the orchestrator portion to the data receiving portions, determining a loss at each of the data receiving portions, sending the losses to the orchestrator portion, propagating the loss through the distributed neural network using a backwards pass from the orchestrator portion to the data receiving portions , and adjusting the neural network based on the backwards pass.

Embodiment 9. The method of embodiment 9, wherein the forward pass, from each of the clients, includes an output from a last layer of the data receiving data portion, wherein the outputs are input into the first layer of the orchestrator portion of the distributed neural network, further comprising generating the loss from labels stored at the clients and an output of a last layer of the orchestrator portion.

Embodiment 10. The method of embodiment 9, further comprising identifying the intersecting identifiers associated with the clients with a privacy preserving mechanism such that none of non-intersecting identifiers are disclosed.

Embodiment 11. The method of embodiment 9 and/or 10, further comprising sending a request, from the orchestrator to the clients, to load at least a batch of the training data into the data receiving portions of the neural network and training the distributed neural network with the training data.

Embodiment 12. The method of embodiment 9, 10, and/or 11, further comprising the orchestrator providing the clients with a structure of the distributed network.

Embodiment 13. The method as recited in any of embodiments 1 to 12.

Embodiment 14. A method for performing any of the operations, methods, or processes, or any portion of any of these, disclosed herein including in embodiments 1-12.

Embodiment 14. A non-transitory storage medium having stored therein instructions that are executable by one or more hardware processors to perform the operations of any one or more of embodiments 1 through 13 or portions thereof.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Any one or more of the entities disclosed, or implied, by the disclosure or Figures and/or elsewhere herein, may take the form of, or include, or be implemented on, or hosted by, a physical computing device. As well, where any of the aforementioned elements comprise or consist of a virtual machine (VM), that VM may constitute a virtualization of any combination of the physical components disclosed herein.

In the example, the physical computing device includes a memory which may include one, some, or all, of random access memory (RAM), non-volatile memory (NVM) such as NVRAM for example, read-only memory (ROM), and persistent memory, one or more hardware processors, non-transitory storage media, UI device, and data storage. One or more of the memory components of the physical computing device may take the form of solid state device (SSD) storage. As well, one or more applications may be provided that comprise instructions executable by one or more hardware processors to perform any of the operations, or portions thereof, disclosed herein. The clients and orchestrators discussed herein may comprise a physical computing device.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for training a distributed neural network, comprising:
    identifying intersecting identifiers for datasets across clients, each of the clients including a data receiving portion of the distributed neural network, the datasets including training data for the distributed neural network, wherein the intersecting identifiers include identifers found in two or more datasets across clients;
    receiving the training data from the clients as input into corresponding data receiving portions;
    generating a forward pass at each of the data receiving portions;
    receiving the forward passes at an orchestrator that includes an orchestrator portion of the distributed neural network;
    calculating a loss at the orchestrator portion and propagating the loss through the distributed neural network using a backwards pass from the orchestrator portion to the data receiving portions; and
    adjusting the neural network based on the backwards pass.

2. The method of claim 1, wherein the forward pass, from each of the clients, includes an output from a last layer of the data receiving data portion, wherein the outputs are input into the first layer of the orchestrator portion of the distributed neural network.

3. The method of claim 1, further comprising generating the loss from labels stored at the orchestrator and an output of a last layer of the orchestrator portion of the distributed neural network.

4. The method of claim 1, further comprising identifying the intersecting identifiers associated with the clients with a privacy preserving mechanism such that none of non-intersecting identifiers are disclosed.

5. The method of claim 1, further comprising sending a request, from the orchestrator to the clients, to load at least a batch of the training data into the data receiving portions of the neural network.

6. The method of claim 1, further comprising the orchestrator providing the clients with a structure of the distributed neural network.

7. The method of claim 1, further comprising training the distributed neural network with the training data.

8. A non-transitory storage medium having stored therein instructions that are executable by one or more hardware processors to perform operations comprising:
- identifying intersecting identifiers for datasets across clients, each of the clients including a data receiving portion of the distributed neural network, the datasets including training data for the distributed neural network, wherein the intersecting identifiers include identifers found in two or more datasets across clients;
- receiving the training data from the clients as input into corresponding data receiving portions;
- generating a forward pass at each of the data receiving portions;
- receiving the forward passes at an orchestrator that includes an orchestrator portion of the distributed neural network;
- calculating a loss at the orchestrator portion and propagating the loss through the distributed neural network using a backwards pass from the orchestrator portion to the data receiving portions; and
- adjusting the neural network based on the backwards pass.

9. The non-transitory storage medium of claim 8, wherein the forward pass, from each of the clients, includes an output from a last layer of the data receiving data portion, wherein the outputs are input into the first layer of the orchestrator portion of the distributed neural network.

10. The non-transitory storage medium of claim 8, further comprising generating the loss from labels stored at the orchestrator and an output of a last layer of the orchestrator portion of the distributed neural network.

11. The non-transitory storage medium of claim 8, further comprising identifying the intersecting identifiers associated with the clients with a privacy preserving mechanism such that none of non-intersecting identifiers are disclosed.

12. The non-transitory storage medium of claim 8, further comprising sending a request, from the orchestrator to the clients, to load at least a batch of the training data into the data receiving portions of the neural network.

13. The non-transitory storage medium of claim 8, further comprising the orchestrator providing the clients with a structure of the distributed neural network.

14. The non-transitory storage medium of claim 8, further comprising training the distributed neural network with the training data.

15. A method for training a distributed neural network, comprising:
- identifying intersecting identifiers for datasets across clients, each of the clients including a data receiving portion of the distributed neural network, the datasets including training data for the distributed neural network, wherein the intersecting identifiers include identifiers found in two or more datasets across clients;
- receiving the training data from the clients as input into corresponding data receiving portions;
- generating a forward pass at each of the data receiving portions;
- receiving the forward passes at an orchestrator that includes an orchestrator portion of the distributed neural network;
- sending an output of the orchestrator portion to the data receiving portions;
- determining a loss at each of the data receiving portions;
- sending the losses to the orchestrator portion;
- propagating the loss through the distributed neural network using a backwards pass from the orchestrator portion to the data receiving portions; and
- adjusting the neural network based on the backwards pass.

16. The method of claim 15, wherein the forward pass, from each of the clients, includes an output from a last layer of the data receiving data portion, wherein the outputs are input into the first layer of the orchestrator portion of the distributed neural network, further comprising generating the loss from labels stored at the clients and an output of a last layer of the orchestrator portion.

17. The method of claim 15, further comprising identifying the intersecting identifiers associated with the clients with a privacy preserving mechanism such that none of non-intersecting identifiers are disclosed.

18. The method of claim 15, further comprising sending a request, from the orchestrator to the clients, to load at least a batch of the training data into the data receiving portions of the neural network and training the distributed neural network with the training data.

19. The method of claim 15, further comprising the orchestrator providing the clients with a structure of the distributed neural network.

20. A non-transitory storage medium having stored therein instructions that are executable by one or more hardware processors to perform the method of claim 15.

* * * * *